United States Patent Office 3,268,393
Patented August 23, 1966

3,268,393
METHOD OF KILLING INSECTS WITH PHOSPHOR-ODITHIOITES AND PHOSPHORODITHIOATES
John H. Wilson, Jr., Richmond, Va., assignor to Mobil Oil Corporation, a corporation of New York
No Drawing. Filed May 17, 1965, Ser. No. 456,474
17 Claims. (Cl. 167—22)

This application is a continuation-in-part of pending application No. 147,157, filed October 24, 1961, now abandoned.

This invention relates to the control of agricultural pests. More particularly it relates to the control of insects, mites, and symphylans with S,S-dipropyl O-methyl phosphoridithioite or a compound of the formula $$(RS)_2P(O)OR'$$

wherein R' is selected from the group consisting of methyl and ethyl, R is a member of the group consisting of propyl and butyl when R' is methyl, and R is propyl when R' is ethyl.

The compounds of this invention may be prepared by reacting substantially two moles of the appropriate alkyl mercaptan with essentially one mole of phosphorus trichloride, and reacting the resulting dialkyl phosphorochloridithioite with one mole of methyl or ethyl alcohol. The S,S-dialkyl O-methyl or O-ethyl phosphorodithioite thus formed may be converted to the corresponding dithioate by reacting it with an oxidant such as hydrogen peroxide.

The organophosphorus compounds of the invention have been found useful for the control or insects, mites, and symphylans at concentrations of from 0.005 to 1% by weight of the total formulation. Because of the low rates required for effective control, it would be impracticable to apply the compounds as such. It is desirable, therefore, to apply them in the form of liquid sprays, or as formulations containing solid vehicles or extenders, in either case the formulation comprising a minor amount of the active ingredient. For example, the compounds may be mixed with a finely divided solid carrier as an aid in uniform distribution. As a general rule, acceptable solid carriers are those which are non-hygroscopic (to prevent caking) and inert (to eliminate undesirable adverse effects upon the formulation itself and upon the environment to be treated). Some of the useful solid carriers are finely ground koalinite, bentonite, talc, attapulgite, and the like. When making up a solid formulation, a more even distribution of chemical can be obtained if it is dissolved in a volatile solvent prior to mixing. After mixing, the solvent is evaporated by any convenient method. Any solvent in which the active ingredient is soluble and which may be readily removed is acceptable provided it does not leave any residue which in itself is toxic.

Liquid compositions of the active components of the invention may be dispersions or emulsions. Since the useful compounds disclosed herein are substantially insoluble in water, it is desirable to add a small amount of an inert, non-phytotoxic organic solvent which can be readily dispersed in the aqueous medium to produce a uniform dispersion. An effective liquid formulation includes the active component, acetone, water, and a surface active agent such as Tween-20 (polyoxyethylene sorbitan monolaurate). Included among the other surface active agents which the art will recognize as useful are Atlox G-3396 and Atlox G-2081, which are, respectively, a blend of polyoxyethylene sorbitol esters and esters of mixed fatty and resin acids and alkyl aryl sulfonates, and a blend of polyoxyethylene sorbitan esters of fatty and resin acids and alkyl aryl sulfonates.

When treating for insects, mites or symphylans, it is necessary to apply only enough of the material to assure contact with these pests. For example, when treating plants infested with one or more of these, control can be achieved by dusting in the manner as for other materials such as DDT, or by spraying a liquid formulation just to the point of run-off it treating pest laden plants. For killing household pests, their walkways may be dusted or sprayed, or the pest may be directly contacted with a formulation containing an effective toxic amount of the active compound.

The following examples will specifically illustrate the preparation and use of the compounds of the invention. It is to be understood that the illustrated concentrations of active ingredients are representative of effective ranges only, and they are not unnecessarily to limit the invention. Since the total range of effective concentrations has not been delimited, it is contemplated that a lesser amount than the lowest disclosed concentration will be effective. Furthermore, although it is evident that maximum control can be expected at the highest disclosed rates, under certain conditions, such as weather and resistance of the pest, a higher rate of application may be necessary for complete control. In regard to the maximum concentration, it is contemplated that the only limiting factor, aside from economics, will be the concentration at which plant injury may become a critical factor. In the examples, "parts" refers to parts by weight.

*Example 1*

(a) *S,S-dipropyl phosphorochloridodithioite.*—Six hundred and seven parts (8 moles) of propyl mercaptan was added to 550 parts (4 moles) of PCl₃ at 25–30° C. in 1 hour and 55 minutes, while stirring, after which the mixture was allowed to stand overnight. The product was separated by fractionally distilling at 5 mm. of Hg up to a boiling point of 140° C.

(b) *S,S-dipropyl O-methyl phosphorodithioite.*—Fifty-four parts of the product from (a) was added at 0–5° C., while stirring, over a period of 30 minutes to a mixture of 12 parts of methanol and 38 parts of triethylamine in hexane. The reaction mixture was allowed to stir for an additional hour at 0–5° C. The mass was filtered to remove the amine hydrochloride. An atmosprere of N₂ was maintained during reaction, stirring and filtration to prevent oxidation. After filtration to remove the hydrochloride, the hexane was fractionated, first at atmospheric pressure, then to 30 mm. at a final pot temperature of 100° C. The residue was distilled at 10 mm. of Hg to yield the desired product boiling at 130–140° C.

(c) *S,S-dipropyl O-methyl phosphorodithioate.*—Fourteen parts of hydrogen peroxide was added to 21.2 parts of the product from (b) in refluxing benzene. Slight cooling was necessary because of the exothermic nature of the reaction. After the addition was completed, stirring continued for 30 minutes. The mass was cooled and washed with two 50-part portions of 5% sodium hydroxide. Aqueous and organic layers were separated and the solvent was removed at a pressure of 30 mm. of Hg and a temperature of 100° C. The resulting residue was distilled at 8 mm. of Hg, yielding the product fraction at 138–150° C.

S,S-dibutyl O-methyl phosphorodithioate and S,S-dipropyl O-ethyl phosphorodithioate were prepared in substantially the same way as described in Example 1.

The following will illustrate the effectiveness of the compounds against insects, mites, and symphylans. For convenience, the compounds will be referred to by number as follows:

| Number: | Compound |
|---|---|
| 543 | S,S-dipropyl O-methyl phosphorodithioate. |
| 607 | S,S-dipropyl O-methyl phosphorodithioate. |
| 104 | S,S-dipropyl O-ethyl phosphorodithioate. |
| 557 | S,S-dibutyl O-methyl phosphorodithioate. |

Example 2

Three grams of whole wheat flour was placed in a 20 x 90 petri dish. One ml. of acetone containing 8, 4, 2, 1, or 0.5 mg. of the test compound was poured over the flour and mixed therewith. After a two-hour waiting period to allow for evaporation of the acetone, the treated flour was pushed to one side of the petri dish. Adult confused flour beetles, *Tribolium confusum*, were placed in the treated flour and the dish was covered with a cheese cloth top. Compounds at each concentration were run in triplicate, and the results below, taken after 48 hours, are averages of the replicates.

| Compound | Rate, mg. | Percent Dead |
|---|---|---|
| 543 | 8, 4, 2 | 100 |
|  | 1 | 73 |
|  | 0.5 | 59 |
| 607 | 8 | 100 |
|  | 4 | 99 |
|  | 2 | 88 |
|  | 1 | 87 |
|  | 0.5 | 77 |
| 104 | 8 | 88 |
|  | 4 | 88 |
|  | 2 | 80 |
| 557 | 8 | 100 |
|  | 4 | 76 |

Example 3

Black Valentine beans heavily infested with mites, *Tetranychus bimaculatus*, were sprayed with 500 p.p.m. (50 mg. of compound, 5 drops of Tween-20, 10 ml. of acetone and 90 ml. of water) and 1000 p.p.m. (100 mg. of compound, 5 drops of Tween-20, 1 ml. of acetone and 99 ml. of water) concentrations of active ingredients just to the point of liquid run-off. Following are the results at varying times after application:

| Compound | Conc., p.p.m. | Percent Dead After— | | | |
|---|---|---|---|---|---|
|  |  | 48 hrs. | 72 hrs. | 5 days | 3 weeks |
| 543 | 1,000 | 80 |  |  |  |
|  | 500 |  | 25 | 90 | 90 |
| 607 | 1,000 |  | 99 |  |  |
| 557 | 500 |  | 50 | 50 | 90 |

Example 4

Pepper plants infested with aphids, *Macrosiphum sp.*, were sprayed with a 1000 p.p.m. concentration of compound 543. The formulation was made by mixing 100 mg. of the compound with 5 drops of Tween-20, 10 ml. of acetone and 90 ml. of water. As in the preceding example, the plants were sprayed just to the point of liquid run-off. After 48 hours, 96% of the aphids were dead.

Example 5

Cotton plants heavily infested with aphids, *Aphis gosypii*, were sprayed to liquid run-off with a 100 p.p.m. concentration of compound 507 (formulated as in Example 4). After 18 hours, 100% of the aphids were dead.

Example 6

Adult German cockroaches, *Blattella germanica* (Linné), were placed in a 14 cm. x 20 cm. test jar, around the rim of which had been placed a ring of white petroleum jelly to prevent escape of the roaches. A Masonite panel (4.5" x 4.5") was sprayed with a 1% solution of compound 104 in acetone such that ¼ gm. of the chemical was deposited on the panel. Means for keeping the panel from contact with the bottom of the jar were provided, and the panel was placed in the jar. After 24 hours, 100% of the roaches were dead.

Without changing the panel, all dead roaches were removed, and live ones were placed in the jar. Twenty-four hours later, results were taken, the dead roaches were removed and were replaced by live ones. This process was continued for 39 days, and results taken on the 40th day indicated that the residual chemical on the originally treated panel was continuing to give 100% control.

Example 7

A 14 cm. x 20 cm. test jar was prepared as described in Example 6, and German cockroaches were placed therein. A formulation containing 0.125% of active ingredient was prepared by dissolving 125 mg. of compound 104 in 10 ml. of acetone, adding 5 ml. of Tween-20 thereto, and diluting to 100 ml. with water. Formulations containing 0.062% and 0.031% of the compound were then prepared by diluting portions of the 0.125% concentrate with the appropriate amount of water.

The roaches in the jar were sprayed with each of the prepared concentrations, taking care to contact all of them without wetting them unnecessarily. To do this, about 10 ml. of each concentration was sprayed under a pressure of about 40 pounds, using a nozzle which gave a fine mist. This mist was passed rapidly over the jar four times, each pass being at right angles to the one before it. The results are summarized in the following table.

| Compound | Rate, percent | Percent Kill | |
|---|---|---|---|
|  |  | 15 hrs. | 24 hrs. |
| 104 | 0.125 | 100 | 100 |
|  | .062 | 90 | 100 |
|  | .031 | 40 | 40 |

Example 8

An emulsifiable formulation of compound 104 was prepared and mixed with sterile soil in an amount to give 2.5 p.p.m. of the compound by weight of the soil. Mixing was accomplished in a Twin Shell blender, the blender being allowed to run until the soil was evenly moistened. The treated soil was transferred to glass jars containing 10 symphylans. The results were checked by removing the soil and counting the live symphylans. Compound 104 was found to give excellent control over a long period when checking results at 4-week intervals. Thus, during a 16-week period, there was 85–100% control of successive infestations of the pest.

Having described the invention, what is claimed is:

1. A method of controlling insects, mites, and symphylans which comprises applying thereto a toxic quantity of the compound of the formula $(C_3H_7S)_2POCH_3$.

2. A method of controlling insects, mites, and symphylans which comprises applying thereto a toxic quantity of an aqueous formulation of a compound of the formula $(C_3H_7S)_2POCH_3$.

3. The method according to claim 2 in which the aqueous formulation contains a surface active agent.

4. The method according to claim 2 in which the aqueous formulation has therein a solvent.

5. A method of controlling insects, mites, and symphylans which comprises applying thereto a toxic quantity of a mixture of the compound $(C_3H_7S)_2POCH_3$ and a finely divided carrier.

6. A method of controlling insects, mites, and symphylans which comprises thereto a composition comprising a minor amount of the compound $(C_3H_7S)_2POCH_3$.

7. A method of controlling insects, mites, and symphylans which comprises applying thereto a toxic amount of a compound of the formula $$(RS)_2P(O)OR'$$

wherein R' is selected from the group consisting of methyl and ethyl, R is a member of the group consisting of propyl and butyl when R' is methyl, and R is propyl when R' is ethyl.

8. The method as defined in claim 7 in which the compound is $(C_3H_7S)_2P(O)OCH_3$.

9. The method as defined in claim 7 in which the compound is $(C_4H_9S)_2P(O)OCH_3$.

10. The method as defined in claim 7 in which the compound is $(C_3H_7S)_2P(O)OC_2H_5$.

11. The method as defined in claim 7 in which the compound is applied to said insects, mites, and symphylans in the form of an aqueous emulsion thereof.

12. The method as defined in claim 11 in which the aqueous formulation has therein a surface active agent.

13. The method as defined in claim 11 in which the aqueous formulation has therein a solvent.

14. A method of controlling insects, mites, and symphylans which comprises applying thereto a toxic amount of a mixture of a compound of the formula $$(RS)_2P(O)OR'$$

wherein R' is selected from the group consisting of methyl and ethyl, R is a member of the group consisting of propyl and butyl when R' is methyl, and R is propyl when R' is ethyl, and a finely divided solid carrier.

15. The method of claim 14 in which the compound is $(C_3H_7S)_2P(O)OCH_3$.

16. The method of claim 14 in which the compound is $(C_4H_9S)_2P(O)OCH_3$.

17. The method of claim 14 in which the compound is $(C_3H_7S)_2P(O)OC_2H_5$.

References Cited by the Examiner

UNITED STATES PATENTS

| | | | |
|---|---|---|---|
| 2,852,549 | 9/1958 | Coover | 167—22 |
| 2,875,229 | 2/1959 | Coover | 167—22 |
| 2,875,230 | 2/1959 | Coover | 167—22 |
| 2,881,201 | 4/1959 | Schrader | 167—22 |
| 2,992,264 | 7/1961 | Miller | 167—22 |
| 3,112,244 | 11/1963 | Goyette | 167—22 |

OTHER REFERENCES

Armed Services Technical Information Agency—NRL Report C-3323 (1948), pages 63, 84.

JULIAN S. LEVITT, *Primary Examiner.*

GEORGE A. MENTIS, *Assistant Examiner.*

UNITED STATES PATENT OFFICE
CERTIFICATE OF CORRECTION

Patent No. 3,268,393                                August 23, 1966

John H. Wilson, Jr.

It is hereby certified that error appears in the above numbered patent requiring correction and that the said Letters Patent should read as corrected below.

Column 3, line 11, for "S,S-dipropyl O-methyl phosphorodithioate" read -- S,S-dipropyl O-methyl phosphorodithioite --.

Signed and sealed this 22nd day of August 1967.

(SEAL)
Attest:

ERNEST W. SWIDER                               EDWARD J. BRENNER
Attesting Officer                                      Commissioner of Patents